United States Patent
Korpak

[15] 3,634,923
[45] Jan. 18, 1972

[54] METHOD OF RECLAIMING TUNGSTEN CARBIDE TOOL BITS

[72] Inventor: Charles Korpak, Union Lake, Mich.
[73] Assignee: General Motors Corporation, Detroit, Mich.
[22] Filed: Aug. 22, 1969
[21] Appl. No.: 852,489

[52] U.S. Cl. ............................................................29/426
[51] Int. Cl. ......................................................B23p 19/00
[58] Field of Search ..................29/426, 401; 76/108; 134/3, 134/41, 42

[56] References Cited

UNITED STATES PATENTS

| | | |
|---|---|---|
| 2,485,926 | 10/1949 | Saucet ..............................29/426 UX |
| 3,085,453 | 4/1963 | Mossberg ..............................76/108 |
| 3,191,700 | 6/1965 | McKenna ..............................76/108 X |

*Primary Examiner*—Charlie T. Moon
*Attorney*—William S. Pettigrew and Peter P. Kozak

[57] ABSTRACT

A method of separating a used tungsten carbide tool bit from a steel tool holder wherein the bit is bonded to the holder by means of a copper-silver alloy by dissolving out the alloy in an acid-water solution consisting preferably of about 47 volume percent nitric acid at room temperature.

2 Claims, No Drawings

METHOD OF RECLAIMING TUNGSTEN CARBIDE TOOL BITS

This invention relates to the reclamation of tungsten carbide tool bits and, more particularly, to a method of separating used tungsten carbide tool bits which are bonded to steel holders by means of a copper-silver alloy from their holders.

A common tool in use today in machining operations is a steel tool with a tungsten carbide cutting bit. Tungsten carbide is particularly applicable in machining operations, particularly in machining cast irons, because of its ability to withstand high impact stresses, high temperatures, and wear. However, because tungsten carbide is very expensive it is only used for the cutting edge of the tool and, therefore, in the manufacture of cutting tools of this type, tungsten carbide bits are formed in the shape of a cutting edge and then bonded to a more inexpensive material such as steel which is strong, durable, and can support the carbide tip. Commonly, the bit is bonded to the steel holder by means of a copper-silver alloy which is heated and then applied between the carbide tip and the steel holder thus fastening the bit to the holder.

One of the most expensive parts of any machining operation is the maintenance of a clean, sharp cutting edge on the tool. Because tungsten carbide bits are expensive, it is desirable to be able to recover these bits from their holders so that they may be reformed into a sharp edge and then rebonded to steel holders for further use. The present method for separating these carbide tips from their steel tool holders is to place the tool in an arc furnace which is heated up to a high temperature for a relatively long period of time in order to break the copper-silver alloy bond between the bit and the tool holder. Since this bond is very strong, it takes a relatively large amount of heat to cause separation. In this method, the furnace temperature is very near the liquation point of the alloy which presents a problem of temperature control so as to break the bond without overheating the bits and fusing them to their holders. This method of furnace separation has a number of disadvantages including lack of control of the temperature, the possibility of excessive heating and fusing of the tip to the steel holder, the relatively long times involved in separation, the relatively high cost involved, the inability to have complete separation of the bits in mass quantities due to uneven heating, and the possible hazards involved in loading and unloading tools from a heated furnace.

Accordingly, it is the principle object of this invention to provide an improved and more efficient method of separating tungsten carbide tool bits from their steel tool holders than has heretofore been available.

A further object of this invention is to provide a controlled environment in which the bits may be separated quickly and efficiently on a mass scale.

These and other objects can, surprisingly, be realized by providing an acid-water solution consisting of from 31 to 70 volume percent nitric acid, preferably 47 volume percent, at a temperature of from 40° to 90° F., preferably at room temperature, and then immersing the tools in the solution for a time sufficient for the solution to completely dissolve the alloy whereby the bits separate from their holders. It has been found that tools with the normal amount of bonding alloy present in tools of this type could be completely separated in from 2 to 6 hours and that the solution could be used for up to three to four times. It has been further found that the life of the solution could be increased by first removing oil, grease, and dirt from the tools with a trichloroethyl solution before immersing the tools in the acid solution. After the bonding alloy is completely dissolved in the solution and the bits have been separated from their holders, the bits and holders are removed from the solution and water rinsed. The tungsten carbide bits may now be reformed by well-known processes into sharp cutting bits and rebonded to the tool holders for further use. After three to four runs the spent solution has a relatively heavy trace of copper and silver, some of which may be recovered by electrolytic deposition of the nitric solution. When operating under the process set forth herein, a controlled reaction takes place in which the alloy bond is completely dissolved in a sufficiently short time for the process to be economical but without damage to either the tungsten carbide bits or the steel tool holders.

The various limits set forth in this invention are critical to the process and yield a quite unexpected result. One would normally expect that a nitric acid solution of strength sufficient to dissolve the copper-silver bond would cause a violent reaction with the steel tool holders and subsequent damage sufficient to render them unusable. However, a nitric acid solution in the range of 31 to 70 volume percent with the optimum being about 47 volume percent yields a controlled reaction wherein the alloy bond is completely dissolved with only minor attack on the steel which yields the beneficial result of polishing the holders. If the solution falls below 31 percent a violent reaction takes place in which the steel is attacked and if the solution is above 70 percent dissolution of alloy does not take place. Temperature control in the range of 40° to 90° F. is also necessary in order for the reaction to proceed as desired. Too low a temperature substantially retards the reaction while too high a temperature causes a violent and undesired reaction. It has been found that optimum results can be achieved when the acid-water solution is at about room temperature and consists of about 47 volume percent nitric acid.

A further condition critical to the invention is that the minimum ratio of the weight of the solution to the weight of the tool is 1.25:1.0. If this ratio falls below the minimum, then a violent and undesirable reaction will take place in which the holders are attacked.

The invention will be more particularly described in the examples which follow. The examples are merely illustrative of the parameters of this invention and set forth an operative process.

EXAMPLE I

Fourteen pounds of commercial grade nitric acid is dissolved in 7 pounds of water to form about a 47 percent nitric acid solution. The solution is then allowed to set in order to dissipate the heat of the reaction and be in equilibrium with the room temperature of about 72°–75° F. Fourteen pounds of used tools are placed in the solution with complete dissolution of the bonding alloy and separation of the tools occurring in about 4 hours. The ratio of the weight of solution to the weight of tools was 1.5:1 and the solution was good for five runs or 70 pounds of tools.

EXAMPLE II

The same procedure as example I was followed except that the concentration of the solution was increased to about 53 percent occurring after about 6 hours. The solution-tool ratio was 2:1.

Thus having described the invention, what is claimed is:

1. A method of separating the assembly comprising a tungsten carbide bit and a steel tool holder wherein said bit is bonded to said holder by means of a copper-silver alloy, said method comprising placing said assembly in a nitric acid-water solution consisting of from 31 to 70 volume percent nitric acid at a temperature of from 40° to 90° F. for a time sufficient for said solution to completely dissolve said alloy whereby said bit separates from said holder, the ratio of the weight of said solution to the weight of said assembly being a minimum of 1.25:1.0.

2. The method of claim 1 wherein said solution consists of about 47 volume percent nitric acid at a temperature of from 72° to 75° F.

* * * * *

PO-1050
(5/69)

UNITED STATES PATENT OFFICE
CERTIFICATE OF CORRECTION

Patent No. 3,634,923      Dated January 18, 1972

Inventor(s) Charles Korpak

It is certified that error appears in the above-identified patent and that said Letters Patent are hereby corrected as shown below:

Column 2, line 55, after "percent" insert -- with separation --.

Signed and sealed this 11th day of July 1972.

(SEAL)
Attest:

EDWARD M. FLETCHER, JR.          ROBERT GOTTSCHALK
Attesting Officer                 Commissioner of Patents